Oct. 9, 1934.  E. W. HUTCHINGS  1,976,171
SHINGLE
Filed Sept. 21, 1932    2 Sheets-Sheet 1
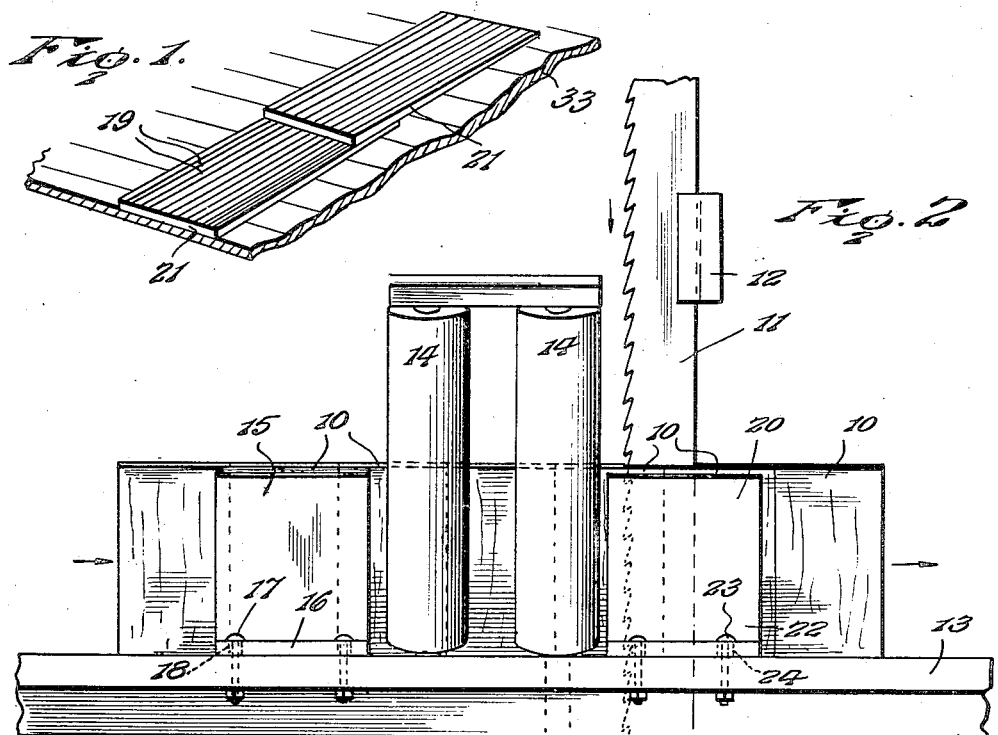

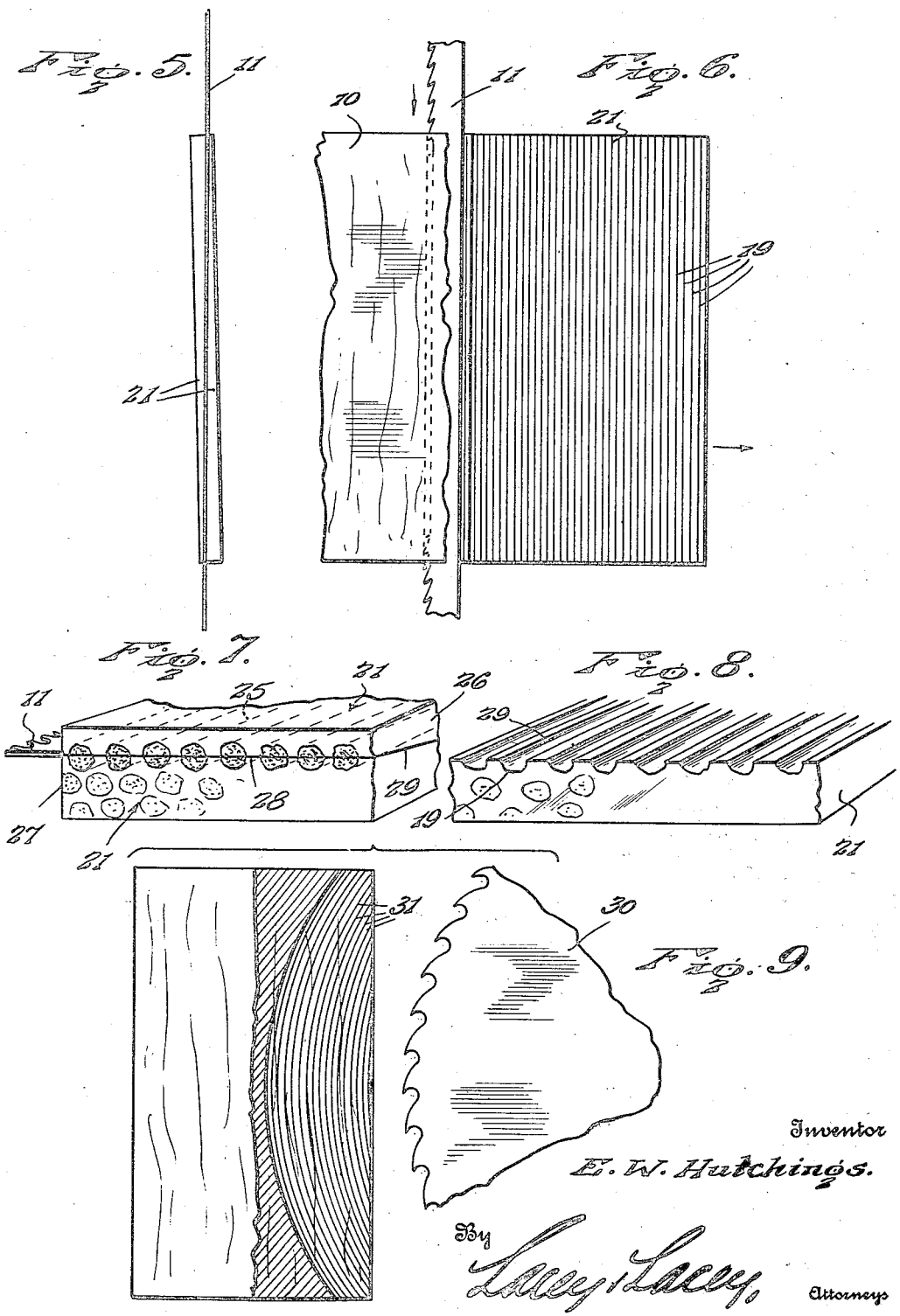

Patented Oct. 9, 1934

1,976,171

UNITED STATES PATENT OFFICE 1,976,171

SHINGLE

Edward W. Hutchings, Perry, Fla.

Application September 21, 1932, Serial No. 634,228

1 Claim. (Cl. 144—309)

This invention relates to methods of manufacturing shingles and has for a principal object to provide a machine rived shingle characterized by exhibiting a corrugated face providing drip channels or grooves longitudinally of the shingle and also exhibiting a dressed face opposite the corrugated face, the product having all of the virtues of the hand rived shingle but in addition being adapted, by virtue of the dressed face, to be applied to a roof or wall without danger of subsequent warping or leakage at the lap.

Hand rived shingles are split longitudinally of the grain and then smoothed with a draw knife, but of necessity this practice is expensive and slow. The shingle exhibits longitudinal corrugations or drip grooves on the face of the shingle which is the result sought by hand riving the shingle. On the other hand, machine manufactured shingles, as today produced, are sawed by a circular saw which cuts across the grain leaving circular saw marks which produce channels that run out of the shingle thereby causing one shingle to drain on to its lateral neighbor when laid as roofing and also causing a rough fuzzy surface which holds moisture and eventually causes the shingle to warp, crack and decay.

The present invention provides a process of utilizing machinery for producing rived shingles that will be superior to the hand rived shingles and may be manufactured with the speed of the old circular sawed shingle. To attain this result one embodiment of the invention consists of dressing a board of suitable size to form the shingle, on both faces, the board being previously sawed to exhibit the grain as extending longitudinally of the board, and then resawing the board obliquely between the dressed faces from edge to edge to simultaneously produce two shingles from the board, each exhibiting a dressed face and a sawed longitudinally corrugated face, and I have discovered that only a band saw is suitable for the resawing operation, the saw having suitable guides for directing boards standing upright or even horizontally laid with their long edges abutting, through the saw in a continuous uninterrupted stream.

With the above and other objects in view the invention consists in certain novel details of construction and combinations of parts hereinafter fully described and claimed.

In the accompanying drawings forming part of this specification,

Figure 1 is a fragmentary perspective view showing my improved shingle applied on a roof, Figure 2 is a side elevation of the resawing step of the process or method of forming the shingle, Figure 3 is a front elevation of the parts shown in Figure 2, Figure 4 is a perspective view showing the two shingles formed simultaneously from one board by the resawing step of the process, Figure 5 is an end elevation showing the board canted with respect to the plane of the saw for the purpose of producing the required taper in the shingle, Figure 6 is a fragmentary side elevation showing the resawing operation and showing the saw marks which produce the corrugations or drip grooves longitudinally of the shingle grain and parallel therewith.

Figure 7 is a diagrammatic perspective view showing the grain or ducts cut longitudinally by the band saw progressing through the board substantially parallel with the ducts.

Figure 8 is a diagrammatic perspective view showing the corrugations or drip grooves produced by the resawing step shown in Figure 7, and Figure 9 is a diagrammatic view of a circular sawed shingle showing the arcuate saw marks running out of the edge of the shingle as customarily found in the usual circular sawed shingle.

In practicing the invention, boards in which the grain runs longitudinally thereof, that is, "as the tree grows", are used and it is desirable that the boards be dressed on both sides so as to present smooth, even plane faces. Such boards are then cut to lengths of fourteen inches to thirty inches long and from four inches to twelve inches wide, according to the length of the shingles desired to be manufactured.

The boards cut to lengths, as above described, are indicated by the numeral 10. Preferably these boards are resawed by a vertical band saw 11, although a horizontal band saw may be used if desired. In the drawing Figure 2, 12 designates the guide of the saw and 13 designates the bed of the saw. In advance of the saw a pair of power driven feed rollers 14 are disposed in upright position on the bed 13 and, as shown in Figure 3, these rollers are canted slightly from the vertical so that the saw extends in a vertical plane, while the axes of the rollers are tilted obliquely with respect to the plane of the saw.

A pair of guide plates 15 are disposed in advance of the feed rollers and each is provided with a base flange 16 which is adjustably secured to the bed by bolts 17 which pass through slots 18 disposed transversely in the base flange. The guide plates may thus be shifted laterally of the bed to dispose their opposed faces parallel with each other and in alignment with the opposing inner faces of the canted rollers. It will be understood that the guide plates 15 are disposed obliquely to the base flanges of the plates and extend with respect to said flanges at the same angular inclination that the axes of the rollers extend to the bed 13 of the saw. The boards 10 are pushed, in upright position and abutting each other at their long edges, between the guide plates 15 and are directed by the plates to the feed rollers which carry the boards in a continuous stream forward to and past the saw.

It will be pointed out that when the boards are thus fed to the saw the grain extends longitudinally from the top edge to the bottom edge of the board so that when each board meets the saw it will be fed through the saw with the grain extending longitudinally of the saw, and the saw will progressively pass through the board from edge to edge of the board longitudinally of the grain. As a result the saw marks 19, as shown best in Figure 6, can be readily seen by the eye to extend with the grain of the board longitudinally of the board. The saw marks produce parallel corrugations or drip grooves which can be readily detected by rubbing the fingers transversely across the sawed surface.

By referring to Figures 2 and 3, it will be seen that a pair of guide plates 20, similar to the guide plates 15, are disposed on the bed 13 on opposite sides of the saw at the discharge end of the machine. These guide plates hold each board against wobbling or jumping up as it passes through the saw and these guide plates are of sufficient width to hold the board steady until it is discharged from the machine in the form of two tapered shingles, as best shown at 21 in Figures 1 and 4. The guide plates 20 are canted with respect to their base flanges 22, which latter are adjustably mounted on the bed 13, by bolts 23 which pass through slots 24 which extend transversely of the base flange, as shown best in Figure 3. The guide plates 20 are disposed in alignment with the guide plates 15 and parallel with the axes of the canted rollers 14 and hold the board canted oblique to the plane of the saw. Consequently as the saw progresses through each board an oblique or bias cut is made which simultaneously produces two shingles of identical taper.

By referring to Figure 7, it will be seen that the ducts or grain 25 of the board to be resawed extend longitudinally of the board and parallel with each other and that as the cut is made these ducts are severed longitudinally and progressively from the leading edge 26 of the board to the following edge 27 of the board, as indicated by the cut 28 made by the saw 11. The board being cut on the bias, as indicated at 29, may exhibit each saw mark or drip groove 19, as of varying depth due to the saw passing from one layer of ducts to the next adjacent layer of ducts. However, the depth of the drip grooves is not of importance, it being only essential that the sawed surface of the shingle exhibits corrugations, serrations, or drip grooves which extend parallel with each other longitudinally of the board, as a direct result of the band sawing step of the process.

As shown in Figure 9, where a rotary saw 30 is employed to cut shingles, the arcuate saw marks 31 pass out of the edge of the shingle. Further, the teeth of the saw, cutting successive arcuate saw marks through the fibrous structure of the ducts and pith therein always mashes the duct fibrous material and pith into a rough fuzzy surface which absorbs and holds moisture so that the shingle does not dry and when subjected to changes in temperature invariably cups, warps and becomes distorted as well as cracked. In contrast to this my improved shingle drains readily longitudinally to the next lowermost shingle so that quick drainage of the roof is promoted and my improved shingle exhibits no fuzziness or roughness whatsoever so that moisture is not held in the structure of the shingle and the shingle remains indefinitely in its original shape and condition.

It will be here stated that ordinary circular sawed shingles are not as a rule formed from seasoned lumber while my improved shingle is formed from seasoned lumber so that the moisture content is reduced to a predetermined minimum prior to working the lumber up into shingles. This condition of the lumber is also believed to contribute to the longevity of the shingle.

It is impossible with a rotary or circular saw to make a continuous cut substantially parallel with and longitudinally of the grain of a board. Therefore, the essence of the present invention is a shingle machine rived with a band saw which performs a continuous cut substantially parallel with the grain and progressively from edge to edge of a dressed board, on a bias between the outer faces of the board, thereby producing two shingles simultaneously, each exhibiting a dressed face and a rough face having saw marks substantially parallel and longitudinally of the grain of the shingle.

The dressed face 32, opposite the band saw rived face, is particularly advantageous in laying the shingles, in so much as it is found that a tight contact with underlying roof boards 33, as shown in Figure 1, can be accomplished, while the lap of contiguous shingles is tighter than ordinary due to the absence of fuzziness on the shingle and thus accumulation of moisture at the lap is eliminated, or at least reduced to a minimum so that the longevity of the shingle is greatly promoted.

What is claimed is:

The process of producing rived shingles each having a dressed face and a longitudinally grooved face which consists in cutting a board dressed on both faces into lengths suitable for shingles, supporting the lengths on end in longitudinal alinement and abutting edge to edge, continuously and successively feeding the lengths in one direction to a band saw, canting the lengths slightly while thus supported, and band sawing the canted lengths longitudinally.

EDWARD W. HUTCHINGS. [L. S.]